United States Patent Office 2,712,991
Patented July 12, 1955

2,712,991

METHOD AND COMPOSITION FOR THE CONTROL OF UNDESIRED VEGETATION

Arthur W. Swezey, Garden Grove, Calif., assignor to The Dow Chemical Company, Midland, Mich., a corporation of Delaware No Drawing. Application November 23, 1951,
Serial No. 257,939

8 Claims. (Cl. 71—2.3)

This invention is concerned with the control of undesired vegetation and is particularly directed to a composition and method for preventing the growth of germinant seeds and young seedlings.

Sterilization of soil, as by the use of large amounts of salt, has been practiced on occasion since ancient times. More recently other inorganic materials such as the chlorates, arsenites, and borax have found specialized uses in the control of undesired vegetation but the concept of selective chemical control of weeds or other noxious vegetation is of fairly recent origin. The wide acceptance of chemical weed control practice has highlighted certain deficiencies in commonly recommended procedures. Thus, the herbicidal chemicals currently used are frequently applied as sprays or dusts to vegetation in an advanced stage of growth and at a time when weeds have already depleted the soil of moisture and nutrients. Moreover, applications of such chamicals to mature weed growth is limited by the possibility of injury to interplanted crop plants or to adjacent desirable vegetation.

It is an object of the present invention to provide an improved method for the control of undesired vegetation. A further object is to provide a method for the control of vegetation before it has had an opportunity to deplete soil reserves of nutrients and moisture. Another object is to provide a method for accomplishing the temporary sterilization of soil areas. Yet another object is to provide for accomplishing the control of undesired vegetation while decreasing the likelihood of injury to nearby desirable plants. An additional object is the provision of a novel composition adapted to be employed for the accomplishment of the indicated herbicidal control. Other objects will become apparent from the following specification and claims.

In accordance with the present invention, it has been discovered that germinant seeds and young seedlings of many plants are controlled by contacting the plant or plant parts with a chloroaryloxypropoxypropanol of the formula

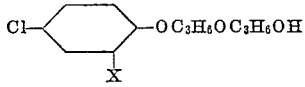

wherein X is chlorine or a methyl radical. These compounds have been found to be particularly active when in contact with the roots of newly germinated seedlings, especially those of broadleafed plants. On the other hand, they have been found to be not particularly active in their effect on the aerial portion of mature plants in comparison to the conventional plant growth control agents such as the naphthoxy and haloaryloxy aliphatic acids. Thus, by the use of the compounds of the present invention, the control of undesired seedlings may be accomplished while largely avoiding the possibility of injury to the succulent leaf and stem portions of well developed or mature desirable vegetation.

In operating in accordance with the invention, the toxic compound is distributed in or on soil or other growth medium such as peat or compost ordinarily infested with the seeds or young seedlings of the vegetation concerned. Any suitable means of distribution may be used provided that the active compound is positioned so that the roots or other tender growth organs of the newly germinated seedlings are subjected to the action of the chloroaryloxypropoxypropanol. The results to be obtained are largely determined by the amount of the propoxypropanol compound applied to a given area of growth medium. When using large amounts of the active compounds a temporary sterilization of the growth medium is obtained whereas with suitable smaller dosages a selective herbicidal effect is achieved since there appears to be a considerable specificity of action with respect to the seedlings of the broadleafed as against the gramineous plants. Under normal conditions of moisture, aeration, and bacterial action, the herbicidal effect of reasonable dosages of the toxicant is dissipated within a few weeks although higher dosages may persist for several months.

In carrying out the invention, the chloroaryloxypropoxypropanols may be compounded to form either dust or spray compositions. A preferred embodiment of the invention includes mixtures of the active ingredient with a finely divided inert solid such as talc, pyrophyllite, gypsum, diatomaceous earth, volcanic ash and the like. Similarly, combinations of the chloroaryloxypropoxypropanols with fertilizers or other soil conditioners may be used.

Where the mixture of solid diluent is to be applied as a dust, the inclusion of wetting, sticking and emulsifying agents in the above described finely divided composition is optional. However, where it is desired to apply the active ingredient as a dispersion in water, a preferred embodiment of the invention consists of a dust mixture modified with suitable surface-active dispersing agents and employed as a concentrate.

Wetting, emulsifying and surface-active dispersing agents compatible in the present compositions include alkali and alkaline earth metal caseinates, blood albumen, alkali metal salts of long chain aliphatic sulfates and alkyl aryl sulfonates, partially neutralized sulfuric acid derivatives of petroleum oils and naturally occurring glycerides, sulfonated derivatives of phenols and aromatic acids and their salts, soaps, lignin derivatives, condensation products of alkylene oxides with phenols and organic acids, alkanolamines, complex ether-alcohols and esters, and clays such as fuller's earth, attapulgite, bentonite and the like. In utilizing the clay minerals as dispersing agents it is frequently desirable to utilize an excess of such agent over and above the minimum necessary for dispersing the composition, the excess clay mineral then acting as an inert diluent.

In an alternative method of carrying out the invention, the chloroaryloxypropoxypropanol is compounded with an emulsifying agent with or without additional organic carrier, as desired, to prepare an emulsifiable liquid concentrate which is suitable for dispersion in water or dilution with oil to prepare dilute spray mixtures. In this embodiment of the invention, the preferred emulsifying agents are oil soluble and particularly include the non-ionic emulsifiers such as the condensation products of alkylene oxides with phenols and organic acids, polyoxyethylene derivatives of sorbitan esters, complex ether-alcohols and the like. However, oil soluble ionic emulsifying agents such as mahogany soaps from the sulfonation of petroleum may also be used. Suitable organic carriers include petroleum oil and distillates, acetone, lower aliphatic alcohols, liquid halo hydrocarbons and synthetic organic oils.

The proportions of materials employed in the compositions may vary considerably, depending on how the composition is to be employed, and whether or not it is designed as a concentrate. Dust compositions for direct application to soil may contain from as little as 0.25 percent to 50 percent or more by weight of the active ingredient. For use as a concentrate in the preparation of sprays or more dilute dusts, active ingredients may run from 10 percent to as high as 90 to 95 percent by weight, the balance of the composition being one of the diluents and carriers and/or wetting and surface-active dispersing agents previously mentioned. Liquid dispersions of the toxicant in water or an organic solvent similarly may vary in concentration from a very low percentage of the active ingredient, e. g., 0.05 to 15.0 percent by weight where the dispersion is to be applied to the soil, to a relatively high percentage, e. g., 5 to 50 percent by weight, or higher, where the dispersion is to be employed as a concentrate.

The amount of chloroaryloxypropoxypropanol to be applied varies considerably depending on such factors as growth conditions, the species to be controlled and whether selective action or temporary sterilization is desired. Good results have been obtained when using from about 1 pound to 200 pounds of the toxic ingredient per acre. Where selective control is desired in vigorously growing crops such as sugar cane or the cereal grains, sensitive species such as mustard are controlled by application of 1 to 5 pounds of the propoxypropanol compound per acre, while 10 pounds or more may be required for selective control of more resistant species and from 50 to 200 pounds per acre is used in effecting temporary sterilization. In operating at the lower dosages commercially useful control of sensitive plants is frequently obtained through depression of germination and stunting of growth of the sensitive, undesired plants without complete killing thereof since the resistant crop can meanwhile make vigorous growth and successfully compete with the weeds thereafter.

The compositions of the present invention are conveniently applied to or dispersed in the soil by either spraying or dusting. Alternatively, they may be dispersed in irrigation water and so distributed over and thru the soil. The techniques involved in the application of spray and dust materials are well established and conventional equipment suffices in the present situation. It is required, however, that relatively uniform distribution of the treating compositions be obtained and that the compositions as deposited on or in the soil provide a toxic concentration of the active ingredient so positioned as to be contacted by the organs of emerging seedlings of the undesired vegetation. Where dusting is employed, the surface of the soil may be dragged or otherwise worked to distribute the toxicant. In general, the toxic ingredient is dispersed through the upper inch or less of the growth medium when practicing preemergent and selective weed control, and it is preferred that the distribution be through the upper ¼ inch to ¾ inch. In such applications, good results are obtained when the toxicant is placed in the zone of maximal weed seed germination but above the region of crop root growth. However, in applying heavier dosages for temporary sterilization, it is sometimes desirable that the substituted propanol compound be distributed through the upper three to six inches of the growth medium. The concentration of the active ingredient in the growth medium obtained by the above operations, will depend both on the amount of the toxicant applied per acre and on the depth of growth medium through which the toxicant is distributed. In general, such concentration is not considered critical provided that the effective ingredient is distributed through the growth medium to achieve at least a minimum toxic dosage in the zone of seed germination. The exact minimum dosage varies depending on such factors as the plant species, temperature, moisture and the type of soil concerned but good results have been obtained when the substituted alkanol compound is distributed through the zone of seed germination in the proportion of at least 0.1 pound of toxicant per cubic yard of growth medium.

In one preferred embodiment of the invention, the chloroaryloxypropoxypropanol compounds are applied in the form of a dust or spray as set forth above to prepared seed beds previously planted to large seeded resistant crops. In such an application, any distribution procedure such as dragging is carefully controlled so as to avoid disturbing the seed of the desired crop plant. Nevertheless, it is desirable that the toxic chemical be distributed through the uppermost layer of the soil. Thus, the active compound is maintained in the area where it most conveniently controls the emergence of the rapidly germinating small seeded weeds such as purslane, pigweed, chenopodium species and wild mustard, while the more deeply planted crop plant germinates and grows with little or no effect from the chemical. A similar procedure of preemergence weed control is suitable for used with crops in which a budded stem portion is planted, for example, with sugar cane and potatoes.

Alternatively, the area to be planted is fitted and the treatment for weed control is carried out two weeks or more before planting with a desired crop and particularly a broadleafed crop. By such a procedure, the weed seedlings in the surace layer of growth medium are controlled and the effect of the chemical is thereafter dissipated. In subsequent planting to a crop a minimum of disturbance of the previously treated surface is desirable in order not to bring to or near the surface new and viable seeds which on germination would yield a fresh stand of undesired vegetation.

The chloroaryloxypropoxypropanols are conveniently prepared by reacting one molecular proportion of an appropriate phenol such as 2,4-dichlorophenol or 4-chloro-2-methylphenol with 2 molecular proportions of propylene oxide in the presence of a suitable catalyst, e. g., sodium hydroxide or sulfuric acid. In one method of making the compounds, the reactants are mixed and heated together in the presence of the catalyst for an hour or longer at a temperature of 170° C. and under a pressure of 200 pounds per square inch. The product may be freed of impurities by conventional methods as by washing with water and distillation under vacuum. Representative chloroaryloxypropoxypropanols have the following properties:

| Compound | Boiling point |
|---|---|
| 2,4-dichlorophenoxy-propoxypropanol | 140°–145° C. at 0.5 mm. pressure |
| 4-chloro-2-methylphenoxypropoxypropanol | 165°–170° C. at 3 mm. pressure |

The following examples illustrate the invention but are not to be construed as limiting:

Example 1

3-chloro-2-methylphenoxy-propoxypropanol was dissolved in acetone with stirring at room temperature to prepare a composition containing 17 percent by weight/volume of the propoxypropanol compound. This composition was applied to areas of moist sandy loam soil planted 24 hours previously with seed of representative broadleaf plants (mustard, redweed, bur clover, and a Lactuca species) and of representative gramineous plants (canary grass, rye grass and a Setaria species). The application was carried out so as to distribute the propoxypropanol compound at the rates of 48 and 192 pounds per acre and to disperse the active compound in the upper three inches of the soil. At subsequent successive intervals of approximately 30 days the treated areas were observed to determine any germination of seed and growth of seedlings. Following such observations the upper three inches of soil were broken up, thoroughly mixed and replanted with fresh seed as before. The test areas were equipped for overhead irrigation and received the equivalent of about four inches of rain per month. On observation about 30 days after initiation of the test no broadleaf species was found to have emerged in either treated area. Some grasses had emerged in both treated areas but germination was poor and the plants which emerged were stunted. The grasses which emerged in the area treated at the higher rate died after emerging. Both broadleaf and gramineous species emerged well and grew vigorously in adjacent, untreated areas. In the two subsequent plantings, observations about 60 and 90 days after the initiation of the test showed no germination or growth of any plants in the areas treated with 192 pounds of toxicant per acre. In the plots treated at 48 pounds, no broadleaf plants emerged at the second planting and only a few, weak gramineous plants were growing at the 60-day observation. After the third planting in the 48-pound plots a few, scattered broadleaf plants grew and a fairly vigorous stand of gramineous species was established by the time of the 90-day observation.

*Example 2*

2,4-dichlorophenoxy-propoxy-propanol was dissolved in acetone as in Example 1 to prepare a composition containing 17 percent by weight/volume of the propoxypropanol compound. This composition was applied to areas of moist sandy loam soil planted 24 hours previously. The types of seed, rates and method of application and subsequent operations, observations and replantings were as set forth in Example 1. On obesrvation about 60 days after initiation of the test, no living plants were found in any treated area except for a few, stunted and moribund grasses in the area treated at 48 pounds per acre. At the 90-day observation, no broadleaf plants were found in either treated area and gramineous species had germinated only in the area treated at 48 pounds per acre. In the latter area, the grasses which had emerged were severely stunted and had grown only to about 25 percent of the growth shown by the same species in adjacent, untreated areas.

*Example 3*

16.5 parts by weight of 4-chloro-2-methylphenoxypropoxy-propanol and 10 parts by weight of an octylphenolethylene oxide condensation product (Triton X-100) were dissolved with stirring at room temperature in sufficient acetone to prepare an emulsifiable concentrate composition containing 1.37 pounds of the active propoxypropanol compound per gallon. Sufficient of the above concentrate composition was dispersed in water to prepare an aqueous spray emulsion containing 2 pounds of the toxicant per 100 gallons and the latter was sprayed at the rate of 250 gallons per acre to give a dosage of 5 pounds of toxicant per acre on young seedling plants of a Lactuca species, canary grass and annual rye grass growing in a sandy loam soil. The application was carried out so as to obtain a thorough coverage of the plants and surrounding soil areas. The propoxypropanol compound appeared to be distributed through the top quarter inch of soil. Observation five weeks after application of the treatment showed all the plants of the Lactuca species dead or very severely burned and stunted. In contrast, the grasses were growing vigorously and had completely recovered from a slight foliage burn which had been apparent one week after the spray application.

*Example 4*

2,4-dichlorophenoxypropoxypropanol and 4-chloro-2-methylphenoxypropoxypropanol are each compounded in the following concentrate composition:

| | Parts by weight |
|---|---|
| Propoxypropanol compound | 50 |
| Attapulgite type clay | 49.5 |
| Methyl cellulose (viscosity 1500 cps.) | 0.5 |

The ingredients are thoroughly mixed in the dry state and are then hammermilled through a 1/32 inch screen. The resulting wettable powder concentrates are individually dispersed in water to prepare aqueous spray dispersions containing 4 pounds of active propoxypropanol toxicant per hundred gallons. The latter spray dispersions are sprayed at the rate of 200 gallons per acre on separate areas of a field fitted and planted 24 hours before the treatment with stem pieces of sugar cane. Annual weed species are controlled while the sugar cane emerges and grows vigorously.

I claim:

1. A method for inhibiting the growth of vegetation which comprises the step of exposing germinant seed and young seedling plants to the action of a growth-inhibiting amount of a compound selected from the group consisting of 2,4-dichlorophenoxypropoxypropanol and 4-chloro-2-methylphenoxypropoxypropanol.

2. A method for the control of the growth of undesired vegetation which comprises distributing in the soil and in close proximity to the germinant seed and the roots of young seedlings of such vegetation a compound selected from the group consisting of 2,4-dichlorophenoxypropoxypropanol and 4-chloro-2-methylphenoxypropoxypropanol, the concentration of the compound in the soil being such as to be toxic to the organs of the seedling plants.

3. A method for rendering a plant growth medium temporarily sterile with respect to the growth of seedling plants which comprises distributing in the growth medium a compound selected from the group consisting of 2,4-dichlorophenoxypropoxypropanol and 4-chloro-2-methylphenoxypropoxypropanol, said compound being employed in the amount of 50 to 200 pounds per acre distributed through the upper 3 to 6 inches of growth medium.

4. A method for inhibiting the growth of seedlings which comprises the step of contacting seed, while positioned in a growth medium, with a growth-inhibiting amount of a compound selected from the group consisting of 2,4-dichlorophenoxypropoxypropanol and 4-chloro-2-methylphenoxypropoxypropanol.

5. A growth inhibiting composition comprising a carrier and dispersed therein as an active ingredient a growth-inhibiting amount of a compound selected from the group consisting of 2,4-dichlorophenoxypropoxypropanol and 4-chloro-2-methylphenoxypropoxypropanol.

6. A growth inhibiting concentrate composition comprising an active ingredient in intimate mixture with a surface-active dispersing agent, such agent being capable of facilitating the dispersion of the composition in water, and the active ingredient being selected from the group consisting of 2,4-dichlorophenoxypropoxypropanol and 4-chloro-2-methylphenoxypropoxypropanol, said active ingredient being employed in the amount of 5 to 95 percent by weight of the composition.

7. A method for controlling the growth of undesired vegetation which comprises distributing 2,4-dichlorophenoxypropoxypropanol in the soil and in close proximity to the seeds and young seedling roots of such vegetation, the concentration of said compound in the soil being such as to be toxic to the organs of the seedling plants.

8. A method for controlling the growth of undesired vegetation which comprises distributing 4-chloro-2-methylphenoxypropoxypropanol in the soil and in close proximity to the seeds and young seedling roots of such vegetation, the concentration of said compound in the soil being such as to be toxic to the organs of the seedling plants.

References Cited in the file of this patent

UNITED STATES PATENTS

| 2,390,941 | Jones | Dec. 11, 1945 |
| 2,523,227 | Mullison | Sept. 19, 1950 |

OTHER REFERENCES

Botanical Gazette, vol. 107 (1946), pages 475 to 507.